United States Patent

Bright et al.

[11] Patent Number: 5,541,862
[45] Date of Patent: Jul. 30, 1996

[54] EMULATOR AND DIGITAL SIGNAL ANALYZER

[75] Inventors: Randall G. Bright, Pittsboro; Peter H. Jansen, Durham; Vijay K. Nagaraj, Cary, all of N.C.

[73] Assignee: Wandel & Goltermann ATE Systems Ltd., Morrisville, N.C.

[21] Appl. No.: 234,854

[22] Filed: Apr. 28, 1994

[51] Int. Cl.[6] .............................. G06F 9/455; G06G 7/48
[52] U.S. Cl. ......................... 364/580; 364/578; 324/73.1; 395/183.04; 395/500
[58] Field of Search ................................... 364/485, 486, 364/487, 580, 578, 579, 131, 134; 395/500, 650, 725, 775, 183.04; 324/73.1, 158.1

[56] References Cited

U.S. PATENT DOCUMENTS

| | | | |
|---|---|---|---|
| 4,622,647 | 11/1986 | Sagnard et al. | 364/580 |
| 4,674,089 | 6/1987 | Poret et al. | 371/25 |
| 4,714,875 | 12/1987 | Bailey et al. | 324/73 PC |
| 4,807,161 | 2/1989 | Comfort et al. | 364/550 |
| 4,862,452 | 8/1989 | Milton et al. | 370/62 |
| 5,036,473 | 7/1991 | Butts et al. | 364/489 |
| 5,109,353 | 4/1992 | Sample et al. | 364/578 |
| 5,132,635 | 7/1992 | Kennedy | 324/158 |
| 5,157,326 | 10/1992 | Burnsides | 324/158 |
| 5,329,471 | 7/1994 | Swoboda et al. | 364/578 |
| 5,359,547 | 10/1994 | Cummins et al. | 364/580 |
| 5,375,228 | 12/1994 | Leary et al. | 395/575 |
| 5,390,194 | 2/1995 | Mannle | 371/27 |

OTHER PUBLICATIONS

Distefano et al., "A Multi–DSP Board for a Parallel Computer . . . " IEEE Apr., 1989, pp. 156–160.
Beltran et al., "Abaco Architecture: Implementation Details" IEEE May, 1991, pp. 1272–1275.
Bier et al., "Frigg: A Simulation Environment for . . . System Development" IEEE, 1989, pp. 280–283.
Nakajo et al., "An Architecture of Multi–DSP System . . . Signal Processing" IEEE Sep. 1992, pp. 193–196.

*Primary Examiner*—Emanuel T. Voeltz
*Assistant Examiner*—Hien Vo
*Attorney, Agent, or Firm*—Moore & Van Allen; William G. Dosse

[57] ABSTRACT

In order to test the functional and parametric characteristics of a unit without overloading a host computer, the host computer downloads a testing program to a plurality of digital signal processor modules which do all of the functional environmental emulation data generation and analysis of the data received from the unit under test. A reconfigurable application interface module is also programmed at the same time as the digital signal processor modules and is thus configured to accept basic emulation data generated by the digital signal processor modules and convert those data to the data environment that the unit under test is expected to experience in use. The application interface module also converts the data received from the unit under test into a format that the digital signal processor modules can analyze, the results of which analysis are made available to the host computer.

15 Claims, 3 Drawing Sheets

EMULATOR AND DIGITAL SIGNAL ANALYZER

TECHNICAL FIELD

This invention relates to electronic emulators and digital signal analyzers and more particularly to emulators that use digital signal processor devices for emulating the signals that a base structure of a computer-based system such as an electronic communications switch would furnish to a portion of a system such as a circuit card, pack, or module for the purpose of functional and parametric testing. Such an emulator and digital signal analyzer sends data streams to the unit under test and analyze the data stream emanating from the unit under test.

BACKGROUND ART OF THE INVENTION

Computer emulators have been around almost as long as digital computers themselves. The usual approach was to write a computer program to make the computer "think" that it was the thing being emulated and then make the computer run accordingly. When the thing being emulated is extremely complex, such as an electronic communications switch, writing an emulation program can be extremely difficult considering the requirements of real-time processing. When writing a program to emulate how the switch would interact with one of its printed circuit (PC) cards, in order to test that card, it is necessary that the testing program make the card or unit under test (UUT) think that it is actually a part of the switch (or other massive system). The cost of writing anew the test program for each different type of PC card that is used in the switch can be prohibitive.

There have been several efforts to make computerized testing devices more adaptable and less expensive to program by dividing them into two parts, with the first part being of a more generalized nature to perform the more elementary tasks and signal processing functions. Then, the second part of the testing device comprises interchangeable adapters each of which is constructed specifically to adapt the output of the first part to the specific requirements of the UUT.

U.S. Pat. No. 4,622,647, granted on Nov. 11, 1986, to Sagnard, et al. discloses a computerized system for testing a microprocessor-equipped printed circuit card. There is a standard base unit which has various components interconnected by a multi-bus. The bus serves interface units, the outputs of which are connected by cables to a specific intermediate unit. The intermediate unit has several multi-busses and is specific to the type of printed circuit card to be tested.

Therefore, the intermediate unit links the standard base unit to the circuit card under test. Grippers on the intermediate unit are used to apply pseudo or faked microprocessor signals to the microprocessor itself or to the rest of the circuitry on the PC card under test to see how they perform. Similarly, a plug replaces the ROM of the unit under test (the printed circuit card) and provides ROM pseudo outputs to the rest of the circuitry.

U.S. Pat. No. 4,807,161, granted on Feb. 21, 1989, to Comfort, et al. discloses an automatic testing system in which a computerized tester has a main system bus which is connected through a buffer to a backplane I/O bus. A complete, microcomputer testing system is then built around that main system bus, which links all of the testing system's peripherals.

The main or fixed computerized portion of the testing system includes the power supplies. The variable part of the test set is optional to suit the specific test to be made. The variable part of the test set is connected to the main part of the test set by sheet cables and the plugs thereof.

The patent describes a bed-of-nails probe connection to the nodes of the specific circuit under test. There is a probe interface as well as a relay matrix to control the nature and timing of the use of those probes.

The test set can be used to test the rest of a microprocessor board by emulating and thus replacing the microprocessor.

The microcomputer that runs the test set can be used by an operator to apply different stimuli and signal waveforms to the circuit or unit under test, using the microcomputer's monitor and keyboard.

There is a buffering and timing circuit (POD) connected between the UUT and the computerized tester, that appears to be placed there to adapt the signals and timing of the tester to the UUT.

Both of these patents disclose systems in which the same computer handles the all aspects of the test set, including storage of the several test programs and processes the generation of the test conditions and determine if the unit under test passes the functional test.

In order to test a different type of product, not only must the computer load a different test program into its random access memory (RAM) but the interface to the UUT must physically be changed, i.e., the interface to the prior type of product must be unplugged and a different physical interface must be plugged in its place.

The host computer of both of these patents must generate the data needed to emulate the environment of the UUT, eg., generate a series of test conditions to feed to the UUT, and then analyze the response,if any, from the UUT.

For example, in a typical test-set computer, it may be necessary to generate a waveform of a particular shape, amplitude, and wavelength. If this is not done in real time (while the test is in process), the digital representation of the wave pattern must be generated before the test and then stored in the memory of the actual test set. If the host computer and the test set are separate and connected with a data link, the transmission of the digital representation of the waveform can inordinately tie up the host computer and the data link and thus slow the process of testing.

If a pattern is generated by the computer in real time, this may be too much to demand of a typical host computer that might be used with a test set. Such a host computer could have a processor that may not be manufactured primarily for and optimized for digital signal generation. Similarly, if the response from the UUT is complex, such as when the response is a data stream that must be analyzed, the typical host computer is further burdened by the need also to analyze that data stream from the UUT.

DISCLOSURE AND SUMMARY OF THE INVENTION

It is an object of the present invention to receive and locally process a data stream received from a unit under test to analyze its content and make conclusions regarding the performance of the unit under test, reporting this conclusion to the test system's host computer.

It is another object of the present invention to minimize the data interchange between the host computer and the tester during the process of testing by decoupling from the host computer the storage and retrieval of the test data that are used for generating the environment data signals to the unit under test and analyzing data signals emanating from the unit under test.

It is still another object of the present invention to provide several signal processors to do all of the data signal generation and analysis functions at the same time by sharing the processing responsibilities between them.

Yet another object of the present invention is to provide a generalized, program-controlled digital signal multi-processor operation by providing universal access to the memory associated with each of a plurality of digital signal processors.

Still another object of the present invention is to provide an electronically changeable interface between a plurality of general-purpose, programmable digital signal processors and the unit under test, such that the interface can be reconfigured as needed for testing a plurality different types of units without the need to physically change the interface.

Yet another object of the present invention is to provide for the use of mechanical and/or electrical interface between the emulator and digital signal analyzer and the unit under test.

BRIEF DESCRIPTION OF THE DRAWINGS

For a more complete understanding of the nature and objects of the present invention, reference should be made to the following Detailed Description taken in connection with the accompanying Drawings wherein the same reference numbers are used to refer to the same or similar items throughout the several figures in which.

DETAILED DESCRIPTION OF THE BEST MODE FOR CARRYING OUT THE INVENTION AND ITS INDUSTRIAL APPLICABILITY

Figure 1:
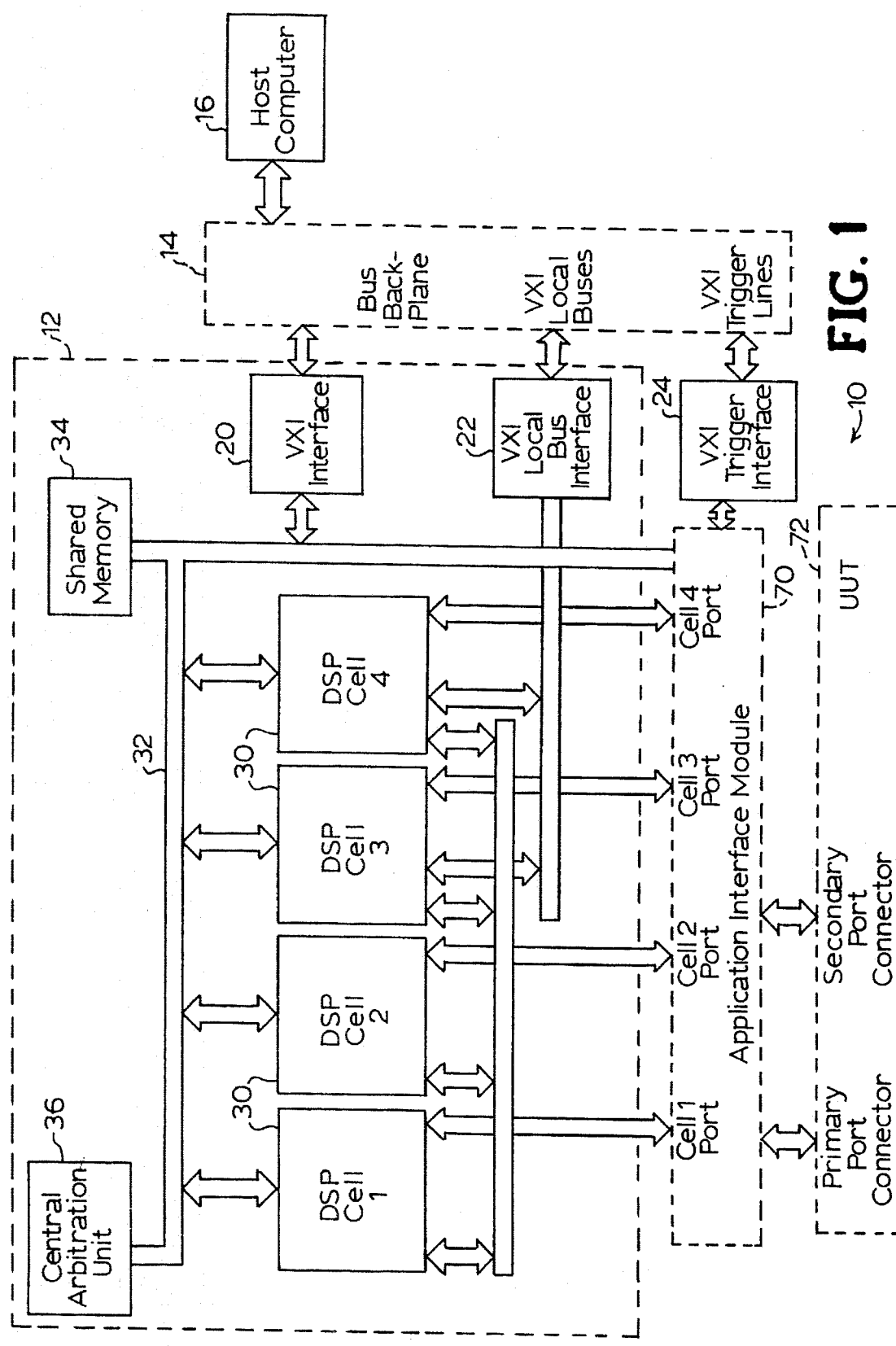
FIG. 1 is an overall, schematic illustration of the emulator and digital signal analyzer.

Referring now to the drawings and more particularly to FIG. 1, an emulator and digital signal analyzer 10 is schematically shown. The emulator and digital signal analyzer 10 is preferably of modular construction, and made up of two modules. Each module is preferably in the form of a separate printed circuit card. However, it will be realized that if it is found to be advantageous, the emulator and digital signal analyzer 10 can be manufactured on a single printed circuit card.

DIGITAL SIGNAL PROCESSING MODULE

The first of the two modules of the emulator and digital signal analyzer 10 is a digital signal processing (DSP) module 12 which performs a program-controlled, general-purpose signal generation and processing function. The DSP module 12 is preferably of the physical type that is plugged into a connectorized motherboard bus or backplane 14 that connects the DSP module 12 to a host computer 16 and other modules of some overall system (not shown).

In this preferred embodiment, the overall system is a computerized testing system for factory functional and parametric testing of printed circuit module cards for a telecommunication system. The backplane 14 preferably carries conductors and connectors according to one of several card-size specifications and bus arrangements known by the umbrella designation "VXI." The bus backplane 14 carries a great many conductors that carry power, data, trigger, timing and other types of signals to all of the modules of the system.

The arrangements and characteristics of the VXI bus are described in a public-domain publication entitled *VXI System Specification.* Revision 1.3 of that Specification is dated Jul. 14, 1989. The Specification was authored by the VXIbus Consortium, Inc. and its sponsoring members. Copies of the Specification can be obtained from sponsoring members, which include a large number of nationally-known electronics and instrument manufacturers, such, for example, as Hewlett-Packard Co., National Instruments Corp., and Tektronix, Inc.

Where it connects with the VXI bus backplane 14, the DSP module 12 includes VXI bus interfacing which is arbitrarily grouped into a VXI interface 20, a VXI local bus interface 22 and a VXI trigger interface 24. The VXI interfaces 20, 22, and 24 contain conventional power, timing, input/output, interrupt handling, buffering and other circuitry routinely needed to allow the circuitry on any module of a specific manufacturer to function in connection with the rigors of the published VXI bus requirements.

The DSP module 12 is preferably based upon four digital signal processor (DSP) integrated circuits (ICs), each DSP IC being the heart of a DSP cell 30. Each of the four DSP cells 30 includes the DSP IC plus all of the peripheral components and circuitry (described in more detail below, in connection with FIG. 2) that are dedicated to that DSP cell, and which the DSP cell does not share. The four DSP cells 30, with common peripherals that the DSP cells do share, perform shared or a form of multi-processing to generate the data emulation signals ultimately furnished to a unit under test (UUT) and to analyze the data signals returned by the UUT (see FIG. 3).

The peripheral assets which the four DSP cells 30 share— along with the host computer 16, which can also access these peripheral assets through the VXI backplane bus 14—include a shared memory bus 32 which connects the four DSP cells with each other, with the VXI interface 20, and with a shared random access memory (RAM) 34, all under control of a central arbitration unit 36.

The central arbitration unit 36 controls access to the shared bus 32 by each of the components connected to the bus, in order to avoid contention and interference. The central arbitration unit 36 implements a conventional mechanism of prioritized and round-robin bus grant allocation schemes. The host computer 16 has the highest priority of access to the peripheral or shared assets, and the DSP cells are allocated access on a round-robin rotating priority basis.

The shared memory 34 is preferably about as big as the RAM memory of a more modern personal computer (PC). A small portion of the shared memory 34 is dedicated to messaging between the host computer 16 and the individual DSP cells 30, and that amount of shared memory is reserved accordingly. Messages to or from the host computer 16 are routed through the VXI interface 20 and the shared bus 32 to or from any DSP.

The messaging (modes of communication) takes place between the host computer 16 and the VXI Interface 20, to the shared memory 34. The type of communication is defined by the VXI System Specification and can be either message based (IEEE-488.2 commands received using the word serial protocol) or register-based, in which the host computer is given direct access to device-control registers through the A24 address space of the VXI bus (backplane 14), with a mailbox register (dedicated or mapped space) within the shared memory 34 for each DSP Cell 30 of the signal generator module 12.

Therefore, each DSP cell 30 has an input and output mailbox space allocation within the shared memory 34. When the host computer 16 writes to the input mailbox of a DSP cell 30, access is decoded, and an interrupt signal is issued to the appropriate DSP cell. The DSP cell 30 then "reads" the message from the host computer 16 and performs the required function. Similarly, a DSP cell 30 can send an interrupt signal to the host computer 16 after writing test results or some other message to the DSP cell's output mailbox space in the shared memory 34.

The host computer 16 is a server that stores all of the emulation and data analysis programs for all of the circuit card units that could be tested by the test system of which the emulator and digital signal analyzer 10 is a part. When tests are to be performed on a particular circuit card product, the program for those tests is downloaded from the host computer 16 to the several DSP cells 30 via the VXI bus backplane 14, the VXI interface 20, the shared bus 32, perhaps the shared memory 32, and then to the individual DSP cell 30, for storage in the dedicated memory of that DSP cell. The downloaded program can also contain reconfiguration information for the application interface module (FIG. 3) to be stored in an EEPROM for control of the gating of the field programmable gate arrays. The host computer 16 also provides the operator interface to the emulator and digital signal analyzer 10, via the host computer's keyboard and messages sent by the host computer through the VXI interface 20.

The downloaded program is divided into separate parts which are segregated by function and routed to the associated DSP cells 30. The test programs resident in the host computer for downloading to the DSP cells 30 are specific to the production unit type to be tested and to groups of unit types. Therefore, these programs are custom designed to correspond to the characteristics of each production unit and to the system with which those units are to be used. All of the data signal generation and data signal analysis connected with the test are performed by the DSP cells 30, and the results are then made available by the DSP cells to the host computer 16. None of the test signals are generated by the host computer and none of the data analysis is performed by the host computer.

DSP Cell

Figure 2:
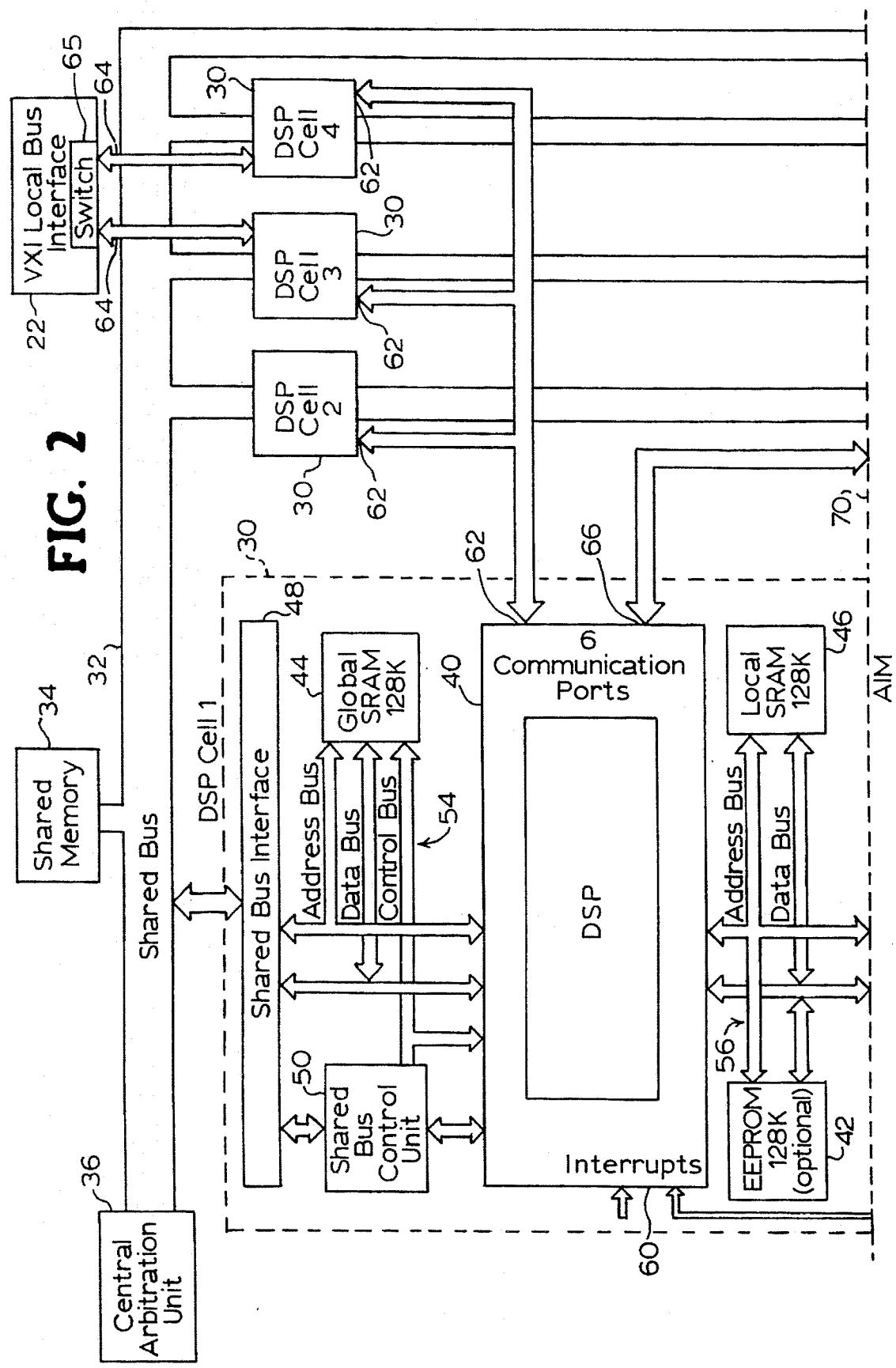
FIG. 2 is a more detailed schematic illustration of a representative one of the several digital signal processor cells that are the heart of the generalized digital signal processing module of the emulator and digital signal analyzer.

Referring now to FIG. 2, the four DSP cells 30 are schematically shown, with one DSP cell illustrated with greater specificity. Each DSP Cell 30 preferably performs one category of emulation data generation and/or data signal analysis processing and includes a single DSP IC 40, an electrically erasable programmable read only memory (EEPROM) 42, a global static random access memory (SRAM) 44, a local SRAM memory 46, a shared bus interface 48, and a shared bus control unit 50. The portion of the program received by a DSP cell 30 passes through the DSP cell's shared bus interface 48 under the control of the shared bus control unit 50 and is stored in the SRAM memory 44 of the DSP cell.

The DSP IC 40 is preferably a Texas Instrument model TMS320C40. Each DSP IC 40 has an external global bus 54, an external local bus 56, various interrupt ports 60, and six communication ports. The terms "global" and "local" are the IC manufacturer's terms for the two busses 54 and 56 that are external to the IC. Therefore, the terms "global" and "local" are also used for the SRAMs memories 44 and 46 that are connected to those two external busses, respectively.

The shared bus control unit 50 allows the DSP IC 40 normally to have immediate (zero wait state) access to the SRAM 44 while still making the SRAM 44 directly accessible by the host computer 16 or the DSP IC 40 of the other DSP cells 30. The shared bus control unit 50 also interacts with the central arbitration unit 36 for an arbitration "win" (priority decision for access) of the shared bus and, in response thereto, controls the enable and direction of the address and data lines of the global bus within the DSP cell 30.

In the case of a transfer from the global SRAM 44 of a DSP cell 30 out onto the shared bus 32, the shared bus control unit 50 of that DSP cell 30 seeks shared bus access from the central arbitration unit 36. Once the shared bus control unit 50 has obtained access to the shared bus 32 by obtaining permission from the central arbitration unit 36, the shared bus control unit 50 signals the associated DSP IC 40 to begin the read/write operation. When the DSP IC 40 has finished transferring data, the shared bus control unit 50 relinquishes control of the shared bus 32 to the central arbitration unit 36.

On all accesses from the shared memory bus 32 to the global SRAM 44 of a DSP cell 30, the shared bus control unit 50 of that DSP cell 30 inhibits the DSP IC 40 from accessing the global SRAM 44 until the shared bus control user has completed the transfer from the shared bus 32 to the global SRAM 44 of the DSP cell 30. In this way, direct communication between any component of the larger system, including the host computer 16 and other DSP cells, can have direct access to the SRAM 44 of a DSP cell 30.

Considerable communication may be needed between the four DSP cells 30 in order to coordinate their shared signal processing activity. It is not deemed advisable to risk clogging the shared bus 32 with this type of inter-cell communication. Therefore, three of the communication ports (collectively 62) on each DSP IC 40 are dedicated to individual direct connection to and communication with each of the other three DSP cells 30.

Arbitrarily, as an option, one additional communication port 64 of each of two of the four DSP cells 30 is connected to the VXI local bus interface 22 to enable these two DSP cells to communicate directly with another VXI module plugged into the VXI backplane bus 14. The VXI local bus interface is connected to twelve conductors of the VXI backplane bus 14, and the DSP module 12 and other VXI module to which a port 64 is connected should be located in adjacent slots or connectors on the VXI backplane bus.

Additionally, the other VXI module must be equipped, in compliance with the DSP IC manufacturer's specification, to communicate directly with the communications port of a DSP IC 40. A switch 65 is included within the VXI local bus interface 22 in order to control the direction of data flow at the connection from the communications port 64.

Another communications port 66 of each DSP IC 40 is available for input and output of signals between the application interface module and each associated DSP cell 30. However, in the preferred embodiment, the communications port 66 is not used.

Each DSP IC 40 is equipped for receiving up to four interrupts 60. One interrupt 60 is used when the host computer 16 communicates with the DSP cell 30. Two of the interrupts 60 are reserved for use by the application interface module of FIG. 3. The application interface module sends and interrupt signal to a DSP cell 30 when there is data has been received from the UUT and are to be sent to the DSP cell or when data are requested by the application interface module. Also, one of the interrupts 60 is connected to the VXI trigger interface 24 for use with trigger conductors on the VXI backplane bus 14, for use by other modules connected to the same backplane bus.

APPLICATION INTERFACE MODULE

Figure 3:
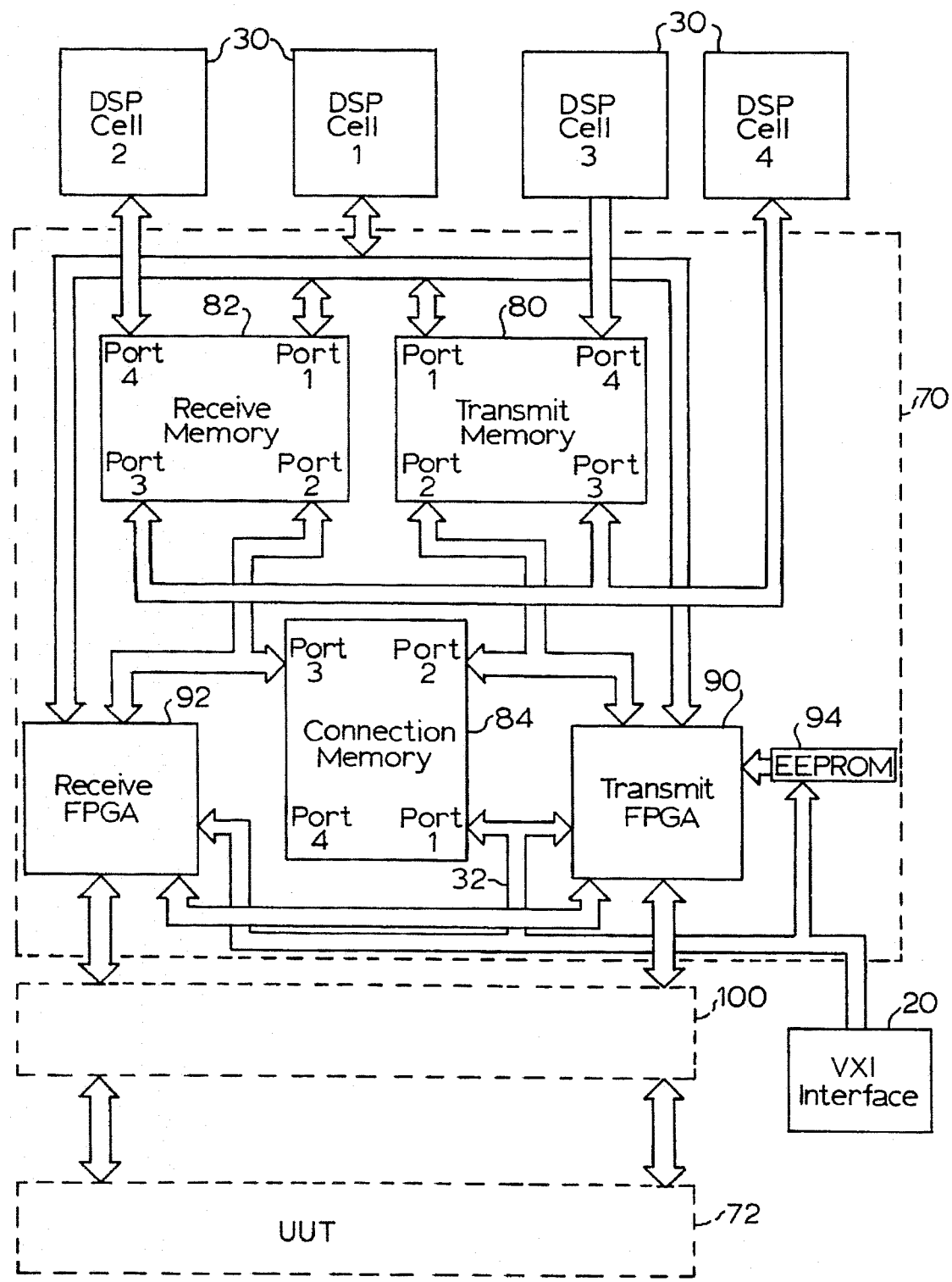
FIG. 3 is a schematic illustration of an application interface module intended to take the data output from the several digital signal processor cells and adapt it to constitute the specific electronic data signal environment for a unit under test and then receive the digital data output signals from the unit under test, adjust and adapt them as needed, and deliver the digital data output signals of the unit under test back to the digital signal processor cells for evaluation.

Referring now to FIG. 3, an application interface module (AIM) 70 is schematically shown, together with interconnection with the four DSP cells 30 of the digital signal processing (DSP) module 12 and with a minimal representation of a production printed circuit card (unit under test—UUT) 72.

The AIM 70 depicted in FIG. 3 includes a transmit memory 80, a receive memory 82, and a connection memory 84. These are preferably three identical static random access memory integrated circuits (SRAMs). The use of three SRAMs 80, 82, and 84 enables simultaneous transmission of data to the UUT 72 and receipt of data from the UUT 72 by all of the DSP cells 30.

Each SRAM memory 80, 82, and 84 has four input-output (I/O) ports. The transmit memory 80 has a port connected to the output (local bus 56 in FIG.2) of the DSP cell 30 that principally sends environmental data signals to the UUT 72, emulating the data signals that would be sent to the UUT 72 by the backplane of the telecommunications system with which the UUT is to be used. For example, the DSP cell 30 that delivers signals to the transmit memory 80 can provide sufficient signalling information to the UUT 72 so as to control it as if it were in its normal environment and monitor the response from the UUT, so as to determine its status. Another DSP can be used to generate up to four time slots of a pulse code modulation (PCM) signal train for transmission to the UUT 72, and yet another DSP can be used to analyze up to four time slots of pulse code modulation data from the UUT 72.

The AIM 70 also has programming adaptation capability, including logic array programming in the form of two configurable or field programmable gate arrays (FPGAs). The two FPGAs are a transmit FPGA 90 for transmitting signals to the UUT 72 and a receive FPGA 92 for receiving signals that are generated by the UUT 72. The transmit FPGA 90 sends environmental signals to the UUT 72, and the UUT generates signals in response to those environmental signals from the transmit FPGA 90 and other test system stimuli from external instruments such as a waveform generator. The signals generated by the UUT 72 are sent to the receive FPGA 92 for testing evaluation.

The transmit FPGA 90 is preferably a very large array of standard logic elements such as multiplexers, flip-flops, buffers, and combinatorial elements which can be electronically configured on "power-up" to perform a wide variety of logic functions such as counters, shift registers, etc. The transmit FPGA 90 is complimented by a similar receive FPGA 92. The FPGAs 90 and 92 are XILINX model XC3190s and are controlled or configured at "power-up" by the contents of an EEPROM 94, which contain the configuration programming to determine what logic the two FPGAs 90 and 92 will exercise or perform.

The configuration program contents of the EEPROM 94 is downloaded from the host computer to the EEPROM 94 along with the programming for the DSP cells 30. Therefore, the FPGAs 90 and 92 configuration is non-volatile (isn't lost upon power-off), and the transmit FPGA 90 contains all of the logic to cooperate with the emulation data generated by the DSP module 12 to emulate the necessary backplane signals that the UUT 72 is expected to receive in its normal operating environment. Similarly, the receive FPGA 92 contains all of the logic to accept the data generated by the UUT 72 and provide raw data to the DSP module 12 to be analyzed by the DSP cells 30 in order to determine the functional and parametric quality of the UUT. Because they are configured by the EEPROM 94, the FPGAs 90 and 92 will stay configured for the same type of UUT indefinitely, until a new configuration is downloaded from the host computer 16 to the EEPROM 94 to configure the FPGAs 90 and 92 to test a different type of unit.

The DSP cells 30 generate the basic emulation data which are stored in the transmit memory 80. The transmit FPGA 90 takes the basic data from the transmit memory 80 and converts or formats those basic data and transmits the converted data to the UUT 72. The DSP cells 30 provide only changed data. If data are to be repeated, they are repeated by the transmit FPGA 90 from the basic data that was stored in the transmit memory 80. For example, with reference to the four PCM time slots mentioned above, the time slots data are generated by the DSP cell 30 and formatted by the FPGA 90 for the UUT 72.

The receive FPGA 92 formats data generated by the UUT 72 in response to its environment signals. The receive FPGA 92 is also configured or programmed by the contents of the EEPROM 94 to convert those UUT-generated signals to a form that another one of the DSP cells 30 can analyze. The converted signals from the receive FPGA 92 are briefly stored and buffered by the receive memory 82, for retrieval by the associated DSP cell 30.

Electronic communication equipment is typically constructed as a bank of printed circuit cards which all perform the same function. Such a bank of cards is also referred to as a drawer or channel bank. When testing a bank of cards, it will be necessary to allow the host computer to select which of the cards will be under test. The input data to and the output data from each of the cards in a bank is typically time division multiplexed into a transmit and receive data stream known as "frames." Each card is assigned a section of the "frame" which is called a time slot.

The connection memory 84 is used to determine which time slot or time slots will carry the data environment emulated by the emulator and digital signal analyzer 10. The host computer downloads a time slot indication to the connection memory 84 through the shared bus 32. The connection memory 84 then controls which time slots are filled with the data that were loaded into the transmit memory 80 by the DSP cells 30. Also, the connection memory 84 selects which time slots in the received data frame contain data that should be routed or steered to the receive memory 82 for analysis by the DSP cells 30. In this way, the DSP module 12 processes basic emulation data for the transmit FPGA 90 and processes received data from the receive FPGA 92 without any reference to which printed circuit card of the frame is actually under test. The selection of the UUT is thus under the direct control of the operator through the host computer 16.

In order to adapt the AIM to a plurality of UUTs, an on-board clock synthesizer (not shown) is preferably provided. The clock synthesizer consists of a very high precision, programmable direct digital synthesizer (DDS); a low-noise, high resolution digital-to-analog converter; a conventional filter; and a zero-crossing detector. Using a very high clock rate to drive the DDS, the AIM can synthesize virtually any data rate a UUT would expect in its normal operating environment. The source of the clock which drives the DDS can either be an on-board oscillator or a common clock on the backplane bus 14.

Each functional portion of the AIM 70 is connected directly to the local bus 56, the EEPROM 42, local SRAM memory 46, or the communication port 66 of a DSP cell 30 in the digital signal processor module 12. The AIM 70 also includes, among other items, a bus which connects the transmit FPGA 90 and the receive FPGA 92 to the UUT 72. The AIM 70 interfaces with the UUT 72 at the UUT's own backplane connectors.

The digital signal processor module 12 (with its VXI interfaces 20, 22, and 24) plugs into the VXI bus backplane 14 and rests in a slot of a component cabinet (not shown). The AIM 70 plugs into outboard end connectors of the digital signal processor module 12 and may rest in the same slot of the component cabinet. Preferably, the connection between the digital signal processor module 12 and the AIM 70 is accomplished with direct connectors rather than with cabling, in order to reduce signal path length. The UUT 72 is then connected to the AIM 70 with cables or may be plugged directly into connectors on a free edge of the AIM card.

A supplemental interface 100 is located between the AIM 70 and the UUT 72 for the purpose of adapting the signals passing between the AIM 70 and the UUT 72 to any peculiarity in the UUT's environment that might not be available in conventional digital logic circuits of the type used in the emulator and digital signal analyzer. For example, the supplemental interface 100 accepts "TTL" logic signals from the transmit FPGA 90 and converts them to some other voltage magnitude. The converse could be provided for the receive FPGA 92. The supplemental interface 100 could include a digital-to-analog converter if the input to the UUT 72 calls for an analog signal. Alternatively, the supplemental interface 100 could include an analog to digital converter if the output from the UUT is an analog signal. Other conversions might include clock adaptations, transformer couplings or relay switching.

The conception and the specific embodiment disclosed above may be readily utilized as a basis for modifying or designing other structures for carrying out the purposes of the present invention. Such equivalent constructions do not depart from the spirit and scope of the invention, as set forth in the appended claims.

What is claimed is:

1. An emulator and digital signal analyzer for automatic functional and parametric testing of a unit under test, within a simulation of that unit's normal functional data environment, comprising:

a plurality of digital signal processors, each said digital signal processor responding to said digital signal processor's own series of stored program steps simultaneously with at least one other of the digital signal processors responding to said other digital signal processor's own series of stored program steps for cooperating in the generation of a sequence of digital representations of the operating environment of the unit and for analysis of data signals from the unit under test, for comparison with what should normally be received from the unit under test;

means for translating the outputs of the digital signal processors into a representation of a normal data signal environment of the unit under test;

shared resources available to all of the digital signal processors;

common means for each digital signal processor to communicate with the shared resources and with every other digital signal processor in the emulator; and means for arbitrating between the digital signal processors whenever at least two of them are trying to utilize the common means in order to access or receive from the shared resources, to withhold access from one digital signal processor and permit access to another digital signal processor.

2. An emulator and digital signal analyzer according to claim 1 wherein the generating means comprises at least one digital signal processor responding to a series of stored program steps.

3. An emulator and digital signal analyzer according to claim 1 further comprising:

means for delivering to the unit under test data signals calculated to test the functional performance of said unit under test in the normal data signal operating conditions of the unit under test.

4. An emulator and digital signal analyzer according to claim 1 further including a bus for interconnecting the digital signal processors, wherein each digital signal processor comprises:

a single digital signal processor integrated circuit;

at least one random access memory devices for storing programming for operating only that single digital signal processor integrated circuit;

a bus interface to link the digital signal processor to the bus, and means on each digital signal processor integrated circuit for directly connecting that digital signal processor integrated circuit to the digital signal processor integrated circuit of every other digital signal processor.

5. An emulator and digital signal analyzer according to claim 4, further including:

a shared memory connected to the bus and usable by every digital signal processor.

6. An emulator and digital signal analyzer according to claim 5, wherein the translating means comprises:

An application interface module having:

means for storing the data received from the digital signal processors for the unit under test and for storing the data received from the unit under test for the digital signal processors;

means for processing and converting data from the digital signal processors to a format expected by the unit under test in the normal operating environment of the unit under test; and means for preprocessing the data received from the unit under test and converting it into a form for analysis by the digital signal processor.

7. An emulator and digital signal analyzer for emulating data signals that a unit under test would expect to receive and for digitally analyzing the data signals generated by the unit under test, comprising:

- a plurality of programmable digital signal processors for generating data and for receiving and analyzing data for functional and parametric testing of at least one unit under test;
- means for formatting the data signals passing from the digital signal processors to the unit under test and from the unit under test to the digital signal processors, so as to emulate the unit under test's normal digital operating environment; and
- means for electronically reconfiguring the nature of the operation of the formatting means for adaptation to different types of units under test.

8. An emulator and digital signal analyzer according to claim 7 further comprising:

- programmable means for steering data between the digital signal processors and a selected one or more of a plurality of units under test.

9. An emulator and digital signal analyzer according to claim 7 wherein the formatting means includes:

- means for the synthesizing the data rate that the unit under test expects in the normal environment of the unit under test.

10. An emulator and digital signal analyzer according to claim 7 further comprising:

- means for providing simultaneous write/read access by one or more of the digital signal processors to the transmit/receive data streams passing between the digital signal processors and the unit under test.

11. An emulator and digital signal analyzer according to claim 7 further comprising:

- supplemental means for adapting the signals to a plurality of signal environments that differ from the signal environment in which the emulator and digital signal analyzer operates.

12. An emulator and digital signal analyzer for emulating the data signals that a unit under test would expect to receive and for digitally analyzing the data signals generated by the unit under test, comprising:

- a host computer having resident therein programs for the testing of a plurality of units under test and through which a command to conduct a test can be transmitted;
- a digital signal generator and analyzer comprising a plurality of digital signal processors for generating data and for receiving and analyzing data for functional and parametric testing of at least one unit under test, all generation of data for delivery to the unit under test and all processing of the data received from the unit under test for analysis thereof being performed by the digital signal generator and analyzer, with the results of said analysis being retrieved by the host computer from the digital signal analyzer;
- memory means associated with the digital signal processors for storing the program for testing a specific type of unit under test;
- means for receiving from the host computer and for storing in the memory associated with the digital signal processors the program for testing a specific type of unit under test; and
- means for formatting the data signals passing from the digital signal processors to the unit under test and from the unit under test to the digital signal processors, so as to emulate the unit under test's normal digital operating environment.

13. An emulator and digital signal analyzer according to claim 12 further comprising:

- means for communicating between the host computer and each individual DSP.

14. An emulator and digital signal analyzer according to claim 12 further comprising:

- means for providing access to the memory associated with each digital signal processor by the host computer or any other digital signal processor.

15. An emulator and digital signal analyzer according to claim 12 wherein:

- each digital signal processor is equipped with a dedicated random access memory;
- means for granting the host computer direct access to the contents of the dedicated random access memory of a digital signal processor by inhibiting the digital signal processors access to the dedicated random access memory until the host computer has completed its access.

* * * * *